US009242628B2

United States Patent
Mylaraswamy et al.

(10) Patent No.: US 9,242,628 B2
(45) Date of Patent: Jan. 26, 2016

(54) AIRCRAFT BRAKE HEALTH MONITORING SYSTEM AND METHOD

(71) Applicant: HONEYWELL INTERNATIONAL INC., Morristown, NJ (US)

(72) Inventors: Dinkar Mylaraswamy, Fridley, MN (US); Andrew Peter Vechart, Plymouth, MN (US); Mark E. Behnke, South Bend, IN (US); Richard Rateick, Jr., South Bend, IN (US); Emmanuel Obiesie Nwadiogbu, Scottsdale, AZ (US); Giles Horban, South Bend, IN (US); Matthew Brown, Granger, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 16 days.

(21) Appl. No.: 13/943,360

(22) Filed: Jul. 16, 2013

(65) Prior Publication Data

US 2015/0025735 A1   Jan. 22, 2015

(51) Int. Cl.

| B60T 17/22 | (2006.01) |
|---|---|
| B64C 25/42 | (2006.01) |
| F16D 55/36 | (2006.01) |
| B60T 8/88 | (2006.01) |

(52) U.S. Cl.
CPC .............. *B60T 17/221* (2013.01); *B60T 8/885* (2013.01); *B64C 25/42* (2013.01); *F16D 55/36* (2013.01); *B60T 2270/406* (2013.01)

(58) Field of Classification Search
CPC ...................................................... F16D 69/00
See application file for complete search history.

(56) References Cited

U.S. PATENT DOCUMENTS

| 7,877,216 | B2* | 1/2011 | Wright | F16D 66/02 188/1.11 E |
|---|---|---|---|---|
| 8,041,490 | B2 | 10/2011 | DeVlieg | |
| 8,152,246 | B2* | 4/2012 | Miller | B60T 17/22 188/79.52 |
| 8,634,971 | B2* | 1/2014 | Cahill | B60T 8/00 188/1.11 L |
| 8,773,289 | B2* | 7/2014 | Maggiore | G08G 5/0008 340/425.5 |
| 2011/0144879 | A1 | 6/2011 | Miller et al. | |

FOREIGN PATENT DOCUMENTS

WO    96/21145 A1    7/1996

* cited by examiner

*Primary Examiner* — Thomas G Black
*Assistant Examiner* — Ana Thomas
(74) *Attorney, Agent, or Firm* — Ingrassia Fisher & Lorenz, P.C.

(57) ABSTRACT

A system method of estimating health of aircraft brake system friction material includes sensing a temperature of the friction material, and supplying the sensed temperature to a processor-implemented thermal model that is configured to estimate friction material temperatures at one or more locations on the friction material. The estimates of friction material temperatures are supplied to a processor-implemented thermal oxidation model that is configured, based on the estimates of friction material temperatures, to estimate friction material loss due to thermal oxidation. Data representative of runway fluid exposure are supplied to a processor-implemented catalytic oxidation model that is configured, based on the runway fluid exposure, to estimate friction material loss due to catalytic oxidation. The health of the friction material is estimated based on the estimates of friction material loss from the processor-implemented thermal oxidation model and the processor-implemented catalytic oxidation model.

20 Claims, 4 Drawing Sheets

AIRCRAFT BRAKE HEALTH MONITORING SYSTEM AND METHOD

TECHNICAL FIELD

The present invention generally relates to aircraft brakes, and more particularly relates to an aircraft brake health monitoring system and method.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. When the aircraft is sufficiently slowed, and is taxiing from the runway toward its ground destination, the aircraft brakes are used to slow the aircraft, and bring it to a stop at its final ground destination.

Presently, many aircraft brake systems include a plurality of hydraulic or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake stack. The actuators, in response to an appropriate pilot-initiated command, move between an engage position and a disengage position. In the engage position, the actuators each engage a brake stack, moving the brake disks into engagement with one another, to thereby generate the desired braking force.

In many instances, the disks that comprise a brake stack are formed of a carbon or carbon composite material. Because the brakes rely on friction to slow or stop the aircraft, the disks are subject to wear. As such, the brakes undergo routine visual inspections to determine the amount of wear of the friction material. At times, these routine inspections detect unanticipated amounts of wear, which can cause unanticipated dispatch delays and/or aircraft downtime. Both of these unanticipated events can be costly to an operator.

Hence, there is a need for a system and method of monitoring brakes on an aircraft that can accurately determine the health of the brakes and thereby alleviate unanticipated delays and/or downtime due to unanticipated amounts of wear. The present invention addresses at least this need.

BRIEF SUMMARY

In one embodiment, a method of estimating health of aircraft brake system friction material includes sensing a temperature of the friction material, and supplying the sensed temperature to a processor-implemented thermal model that is configured to estimate friction material temperatures at one or more locations on the friction material. The estimates of friction material temperatures are supplied to a processor-implemented thermal oxidation model that is configured, based on the estimates of friction material temperatures, to estimate friction material loss due to thermal oxidation. Data representative of runway fluid exposure are supplied to a processor-implemented catalytic oxidation model that is configured, based on the runway fluid exposure, to estimate friction material loss due to catalytic oxidation. The health of the friction material is estimated based on the estimates of friction material loss from the processor-implemented thermal oxidation model and the processor-implemented catalytic oxidation model.

In another embodiment, a system for estimating remaining useful life of brake system friction material includes a temperature sensor, a runway fluid data source, and a processor. The temperature sensor is configured to sense a temperature that is at least representative of the friction material and supply a friction material temperature signal. The runway fluid data source configured to at least selectively supply data representative of runway fluid exposure. The processor coupled to receive the friction material temperature signal and the data representative of runway fluid exposure and is configured, upon receipt thereof, to estimate friction material temperatures at one or more locations on the friction material, estimate friction material loss due to thermal oxidation based on the estimates of friction material temperatures, estimate friction material loss due to catalytic oxidation based on the runway fluid exposure, and estimate the remaining useful life of the friction material based on the estimates of friction material loss.

Furthermore, other desirable features and characteristics of the brake health monitoring system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
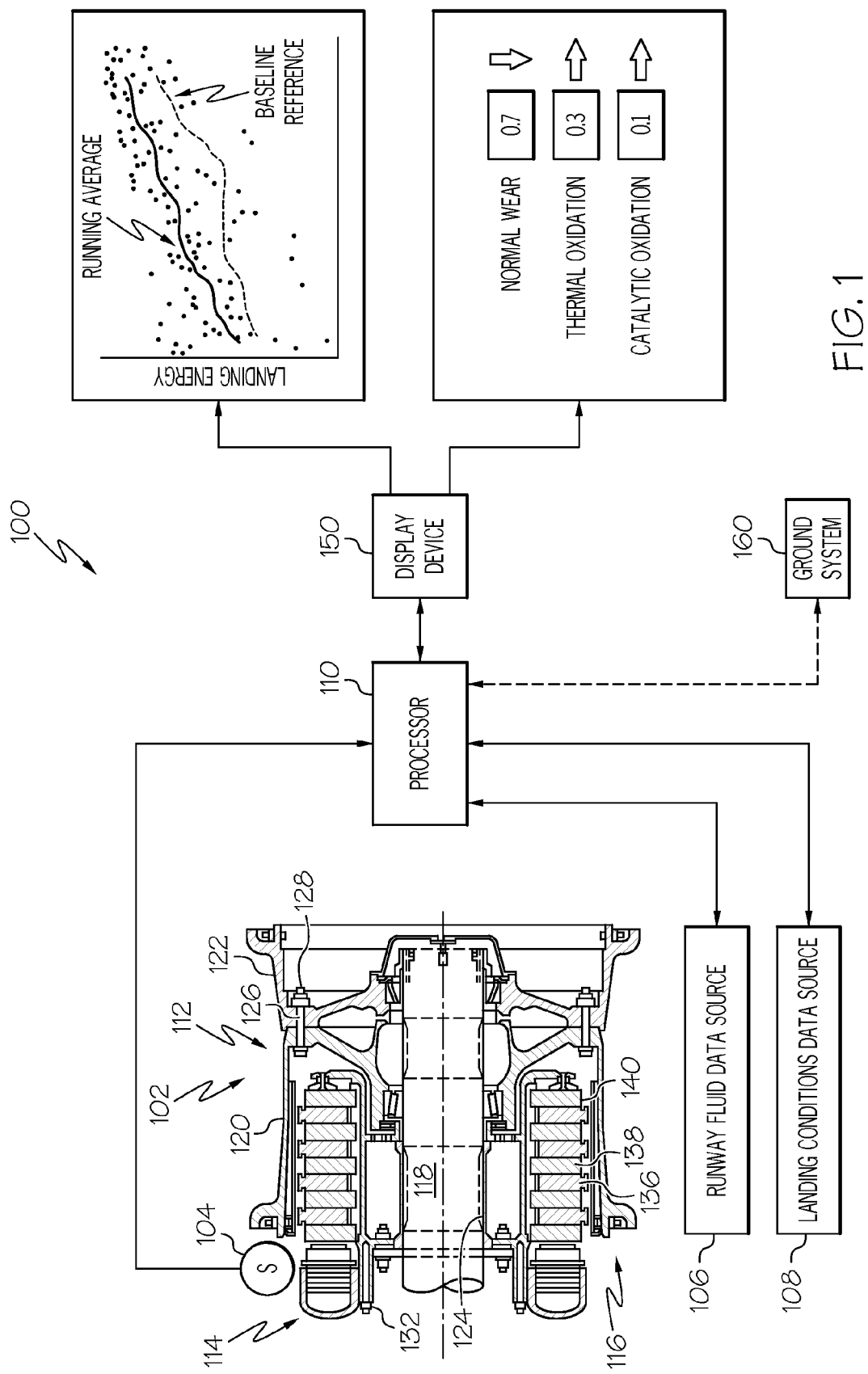
FIG. 1 depicts a functional block diagram of one embodiment of an aircraft brake health monitoring system.

Referring first to FIG. 1, a functional block diagram of an aircraft brake health monitoring system 100 is depicted, and includes an aircraft brake 102, a temperature sensor 104, a runway fluid data source 106, a landing conditions data source 108, and a processor 110. Before proceeding further, it will be appreciated that the system 100 may be, and indeed likely would be, implemented on aircraft that include more than one aircraft brake 102. For convenience and ease of both illustration and description, only a single aircraft brake 102 is depicted.

Returning again to the description, the aircraft brake 102 may be variously configured and implemented, but in the depicted embodiment an aircraft wheel 112 is mounted over the aircraft brake 102, which includes an actuator 114, a brake stack 116, and an axle 118. The wheel 112 includes an inboard wheel half 120 and an outboard wheel half 122. The outboard wheel half 122 is coupled to the inboard wheel half 120 via lug bolts 126 and lug nuts 128. As is generally known, an inflatable tire (not shown) may be mounted on the wheel 112. Thereafter, the lug nuts 128 can be tightened on the lug bolts 126, and the inflatable tire can be inflated.

The actuator 114 is coupled to a torque tube 124 via, for example, actuator bolts 132. The actuator 114 is configured to selectively engage and disengage the brake stack 116, which includes alternating rotor disks 136 and stator disks 138. The rotor disks 136 are engaged by the inboard wheel half 120 via, for example, rotor drive keys 140, and the stator discs 138 are engaged by the torque tube 124 via, for example, splines 144. The rotor disks 136 and stator disks 138 provide opposing friction surfaces for braking an aircraft. As such, the rotor disks 136 and stator disks 138 that comprise the brake stack 116 are preferably formed of robust, thermally stable friction materials capable of operating at relatively high temperatures. Some non-limiting examples of suitable friction materials include various metal alloys, such as, for example, a super alloy based on nickel (Ni), cobalt (Co), iron (Fe), or the like. Other suitable friction materials include various carbon-carbon (C—C) composite materials.

The temperature sensor 104 is installed adjacent the brake stack 116, and is configured to sense a temperature that is at least representative of the friction material. The temperature sensor 104 may be implemented using any one of numerous known temperature sensors including, for example, a resistance temperature detector (RTD), a thermocouple, an optical temperature sensor, or a solid-state temperature sensor, just to name a few. Moreover, although only a single temperature sensor 104 is depicted, it will be appreciated that each aircraft brake 102 may be implemented with more than one temperature sensor 104. Regardless of the type or number of temperature sensors, each temperature sensor 104 is configured to supply a brake temperature signal representative of the sensed temperature to the processor 110. It will be appreciated that each temperature sensor 104 be implemented as part of a brake temperature monitoring system (BTMS) that may be installed on the aircraft. Moreover, although a simple value at a specific time is sufficient for most embodiments, the approach can make use of snapshot values taken at multiple times.

The runway fluid data source 106 is in communication with the processor 110, and is configured to supply data representative of runway fluid exposure to the processor 110, such as, for example chemical properties of commonly used runway fluids. The runway fluid data source 106 may be variously configured and implemented. For example, the runway fluid data source 106 may be a data storage device that has the data representative of runway fluid exposure stored thereon. Alternatively, the runway fluid data source 106 may be a user interface via which a user inputs the data representative of runway fluid exposure directly to the processor 110. In other embodiments, the runway fluid data source 106 may be configured to determine the likelihood that a runway fluid may be present based, for example, on ambient conditions and airport location, and supply appropriate runway fluid data, if necessary, based on the determined likelihood.

No matter its specific implementation, the data representative of runway fluid includes data representative of the chemical composition of runway fluid, and data representative of the exposure time of the aircraft to the runway fluid.

The landing conditions data source 108 is in communication with, and is configured to supply data representative of aircraft landing conditions to, the processor 110. Like the runway fluid data source 106, the landing conditions data source 108 may be variously configured and implemented. For example, the landing conditions data source 108 may be a data storage device that has the data representative of aircraft landing conditions stored thereon. The landing conditions data source 108 may alternatively be a user interface via which a user inputs the data representative of aircraft landing conditions directly to the processor 110. In one particular embodiment, the landing conditions data source 108 is implemented using an on-board aircraft condition monitoring system (ACMS). No matter its specific implementation, the data representative of aircraft landing conditions includes, for example, aircraft landing energy, the number of taxi stops, the ambient temperature while landing, brake pressure and, in some embodiments, aircraft velocity.

The processor 110 is configured to implement a process for estimating the health of aircraft brake system friction material based, in part, on estimates of friction material loss. The general process that the processor 110 implements is depicted in flowchart form in FIG. 2, and will be briefly described. The process 200 is implemented (201) at commencement of each landing sequence. Upon its initiation, friction material temperatures are sensed (202), via the temperature sensor 104, and supplied to a processor-implemented thermal model. The processor-implemented thermal model estimates friction material temperatures at one or more locations on the friction material (204). The estimates of friction material temperatures are supplied to a processor-implemented thermal oxidation model and, based on the estimates of friction material temperatures, the thermal oxidation model estimates friction material loss due to thermal oxidation (206). As FIG. 2 further depicts, data representative of runway fluid exposure is supplied to a processor-implemented catalytic oxidation model (208). The processor-implemented catalytic oxidation model, based on the runway fluid exposure, estimates friction material loss due to catalytic oxidation (210). The health of the friction material is then estimated based on the estimates of friction material loss (212).

Figure 2:
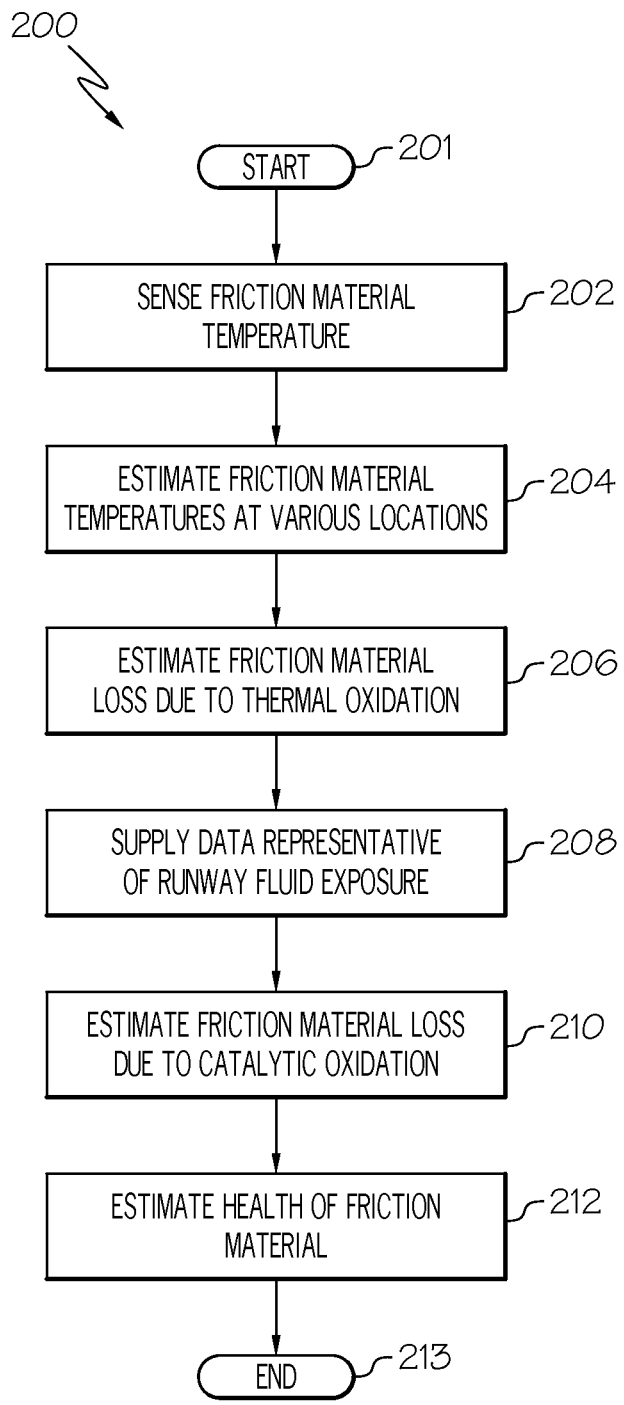
FIG. 2 depicts a process, in flow chart form, that may be implemented by the system of FIG. 1 to estimate friction material health.

Before proceeding further, it should be noted that, although not depicted in the generalized process in FIG. 2, the processor 110 may also be configured, as will be described further below, to estimate friction material loss due to normal wear, and to also estimate landing (and take-off) energy. It is additionally noted that the process depicted in FIG. 2 and described above is associated with a single aircraft brake 102, but that the processor 110 is preferably configured to implement a "multivariate" approach. That is, the processor 110 preferably implements the process 200 for all of the brakes on the aircraft, and not just one brake at a time. Moreover, the processor 100 is further configured to use data from a series of landings, not just a single landing, since an aircraft makes a series of landing over time. The processor 110 makes use of the "multiplicity" of brakes and "repetitive samples over several landings" to generate the estimates of health that are discussed further below.

Figure 3:
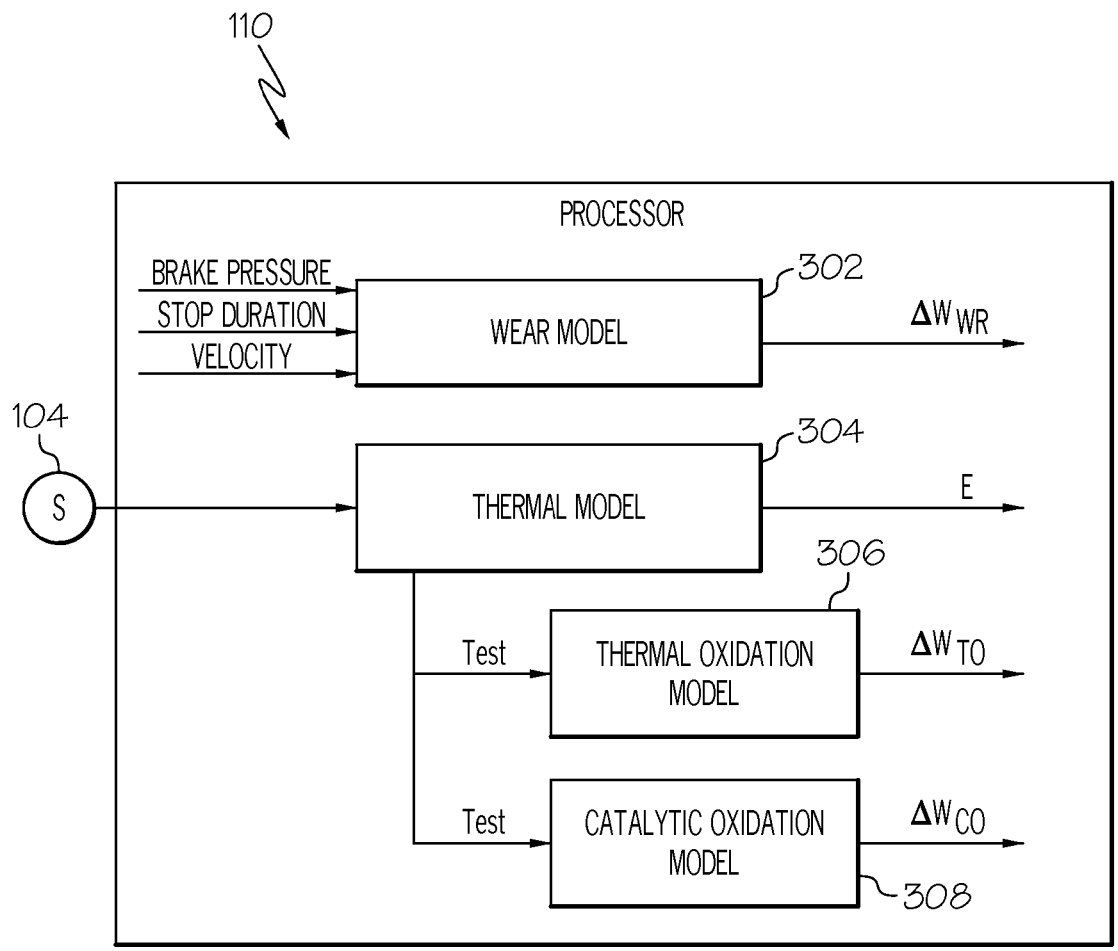
FIG. 3 depicts a functional schematic representation of various models that are implemented in the processor of FIG. 1.

Returning once again to FIG. 1, to implement the above-described process, the processor 110 is coupled to receive the brake temperature signal, the data representative of runway fluid exposure, and the data representative of aircraft landing conditions. The processor 110 is configured, upon receipt of the brake temperature signal and these data, to estimate friction material loss and, based on the estimated friction material loss, to estimate the health of the friction material and thus the aircraft brake 102. To implement this functionality, the processor 110 is configured to implement various models. With reference to FIG. 3, these models will now be described.

The models implemented in the processor 110 include a wear model 302, a thermal model 304, a thermal oxidation model 306, and a catalytic oxidation model 308. The wear model 302 is used to determine the friction material weight loss due to normal wear. The wear model 302, an embodiment of which will now be described, implements a numerical integration method to determine the friction material weight loss.

The primary function of the aircraft brakes 122 is to slow-down or stop the aircraft. During these operations the friction material wears. The rate at which the friction material wears depends on the number of stops and slow-downs that occur while the aircraft is taxing on the ground. As is generally known, taxiing occurs both after a touchdown and before a takeoff. The wear model implements the following empirical model:

$$\Delta W_{wr}(n) = K + \Sigma[a_1(AL/t)_{tko}] + \Sigma[a_2(AL/t)_{lng} + a_3\theta_{tko} + a_4\theta_{lng}].$$

where:
$\Delta W_{wr}(n)$ is the change in friction material weight,
K is a constant that corresponds to initial friction material weight,
(AL/t) is the area loading per unit time,
$\theta$ is the rolling radians,
Coefficients $a_1$, $a_2$, $a_3$, and $a_4$ are constants, and
tko and lng denote takeoff and landing taxi sequences.

The area loading per unit time (AL/t) is calculated when the aircraft is stopped and the pilot has applied a maximum brake pressure. More specifically, when the aircraft has spent a period of time (t) stopping, the loading per unit time is defined as:

$$AL/t = \frac{\text{(total brake energy)}/\text{(friction area)}}{\text{stop duration } (sec)}$$

The rolling radians ($\theta$) correspond to the distance travelled by the aircraft while the brakes are partially applied. When the aircraft is moving and some non-zero brake pressure is applied, and if $D_R$ is the distance the aircraft rolls, then the rolling radians ($\theta$) for an aircraft having a wheel diameter $W_d$ is defined as:

$$\theta = \frac{D_R}{W_d}$$

The summation signs ($\Sigma$) indicate that there could be multiple stops while taxiing. The number of aircraft stops during both a landing sequence and a takeoff sequence is an integer number greater than or equal to zero. This number is calculated using parameters supplied from one or more aircraft systems, such as the aforementioned ACMS, and may be determined by estimating aircraft linear velocity (v). In one exemplary embodiment, the aircraft is defined as being stopped when $v \leq 2.25$ m/s for 20 seconds, and is assumed to be moving when $v > 6.25$ m/s. These are merely exemplary values and may be varied, if needed or desired.

In addition to the above, as a first approximation it is assumed that the pilot is "riding the brakes" when aircraft engine thrust is above its idling threshold and the pilot is applying the brakes (e.g., brake pressure is greater than a minimum value) and the airplane is moving with velocity greater than 2.25 m/s.

It should be noted that numerous techniques may be used to estimate aircraft velocity (v) if this parameter is not measured by a velocity sensor and recorded and supplied by, for example, the landing conditions data source 108 (e.g., ACMS). One technique involves using a global positioning system (GPS). With this technique, aircraft position given as a latitude/longitude pair. The distance travelled between two successive GPS-supplied aircraft positions is given by the well-known haversine formula, and aircraft velocity is calculated as:

$$v = \frac{\delta d}{\delta t}$$

Another technique uses a flight-path accelerometer value. With this technique, the velocity of the aircraft (v) between two successive acceleration values is obtained via integration:

$$v = \int a \, dt$$

The thermal model 304 is supplied with the brake temperature signal and is configured to estimate the friction material temperatures at one or more locations on the friction material. The thermal model 304 is a finite-element/finite-difference model. For a landing sequence, the model is defined as follows:

$$T_{node}(t) = M(T_{amb}, FA_{cr}, FA_{ax}, L_S, AC_{LW}, W_{fric}),$$

where:
$T_{amb}$: Ambient Temperature,
$FA_{cr}$: Cross cooling air flow,
$FA_{ax}$: Axial cooling air flow,
$L_S$: Number of landing taxi stops,
$T_S$: Number of takeoff taxi stops,
$AC_{LW}$: Aircraft landing and taxi energy,
$W_{fric}$: Weight of the friction material, and
$T_{node}$: Node temperature.

It will be appreciated that the nodal locations for which temperatures are determined using this model may vary. Some example nodal locations include lug temperatures, axle temperatures, frame structure temperatures, and brake fluid temperatures, just to name a few. No matter the specific nodal locations that are used, the output from the thermal model 304 is typically values of temperature-versus-time at the nodal location(s).

As may be appreciated, the nodal temperature-versus-time values ($T_{node}(t)$) are functions of several parameters, some of which are unknown. For example, values of $T_{amb}, FA_{cr}, FA_{ax}, L_S, AC_{LW}, W_{hs}$ need to be either estimated or provided. An approach for calculating the number of taxi stops $L_S, T_S$ was previously described. In the following paragraphs, an algorithm for calculating the remaining parameters, and hence determining the "right" temperature-versus-time profile to select for estimating $\Delta W_{to}(n)$ will be described.

As a first-order approximation it is assumed that the following input parameters are constant:

$$FA_{cr} = 1.75 m/s, FA_{ax} = 10.3 m/s, AC_{LW} = MLW\, KJ$$

A temperature sensor lag model ($\phi$) is given as follows:

$$\hat{T}_{sense} = \hat{T}_{node=sense}(t^*),$$

where t* denotes the elapsed time when the sensor temperature is actually recorded after the pilot applies the brake, and the "hat" indicates that this is a model-estimated temperature value.

The error between actual sensed temperature and the model estimated temperature value is given by:

$$e = (T_{sense} - \hat{T}_{sense}).$$

To provide an optimal "heat sink weight" (e.g., friction material weight) and a "landing energy" that would minimize the error (e) between the actual sensed temperature and the model-estimated temperature, the following least squares estimation (LSE) scheme is used:

$$\min_{W_{hs}, AC_{LW}} \left(T_{BTMS} - \hat{T}_{BTMS}\right)^2$$

It is possible to calculate an estimate of these parameters at the end of each landing. That is, calculate $\hat{W}_{hs}(n)$ based on $T_{amb}(n)$, $L_S(n)$ and $T_{sense}(n)$ (for landing sequences) or based on $T_{amb}(n)$, $T_S(n)$ and $T_{sense}(n)$ (for take-off sequences). However, this particular methodology has been found to be relatively noisy. Therefore, a robust LSE scheme is preferably employed. This involves estimating the parameters over a series of p consecutive landing take-off sequences, and assumes that the friction material weight is "quasi-steady" among p sequences. That is, $$\hat{W}_{hs} = \min_{W_{hs}, AC_{LW}} \sum_{i=n-p+1}^{n} \left(T_{BTMS}(i) - \hat{T}_{BTMS}(i)\right)^2$$

Having described the thermal model 304 and its formulation, the thermal oxidation model 306 will now be described. In general, and as FIG. 3 depicts, the thermal oxidation model 306 receives at least some of the friction material temperature estimates supplied by the thermal model 304 and is configured to estimate the friction material loss due to thermal oxidation.

It is assumed that thermal oxidation is occurring if the peak temperature at a point on the friction material 104 is greater than a predetermined temperature (e.g., $T^{peak} > T_{predetermined}$). The weight loss due to thermal oxidation ($\Delta W_{to}$) is then determined as follows:

$$\Delta W_{to} = TGA(T^{peak}(n), \tau)$$

where (TGA) is a weight loss function determined experimentally from well-known thermo-gravimetric analysis (TGA) tests, and ($\tau$) is the dwell time in seconds.

Turning now to the catalytic oxidation model 308, this model 308 uses experimentally determined data for bare carbon friction material and friction material coated with, for example, an antioxidant (AO) coating. Using these experimental data, the catalytic oxidation model 308 receives the data representative of runway fluid exposure and is configured to estimate friction material loss due to catalytic oxidation ($\Delta W_{co}$).

Figure 4:
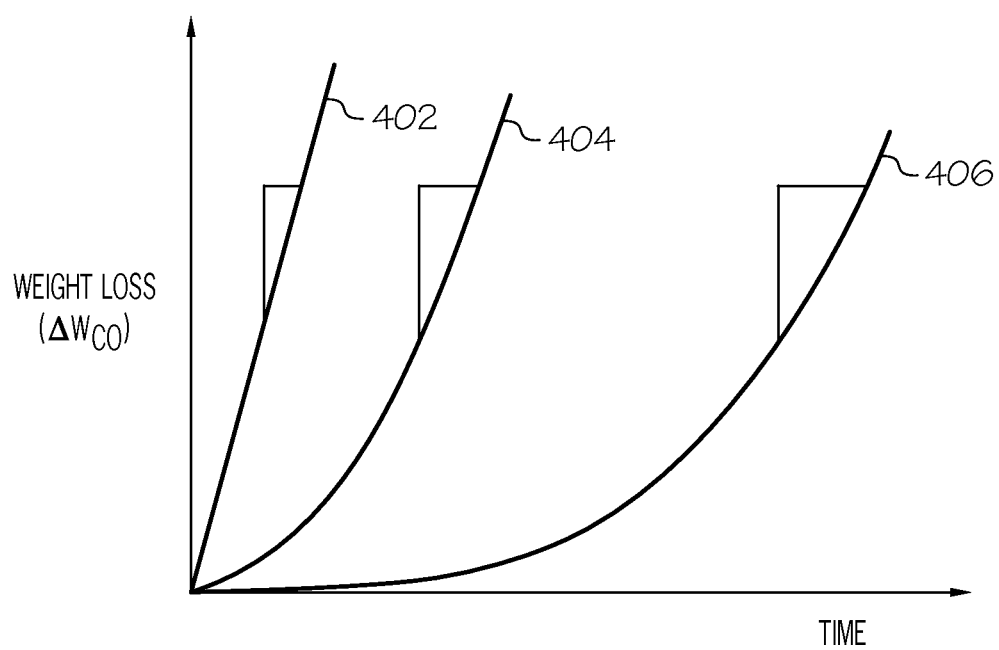
FIG. 4 graphically depicts friction material weight loss isotherms.

As is generally known, AO coatings inhibit oxidation, but do not prevent it altogether. With reference to FIG. 4, a schematic weight loss isotherm is depicted. As this shows, the oxidation of a carbon brake disk (e.g. friction material) vs. time follows a parabolic rate law. That is, at short times, there is little weight change, but with increasing time, weight loss rate increases. Without AO, as curve 402 depicts, this is a very steep parabola. As curves 404 and 406 show, the AO coating significantly widens the parabola relative to bare carbon. However, given sufficient time, the AO will be undermined by oxidation, thereby exposing unprotected carbon. As this process continues, the slope of the parabola will become increasingly more parallel to that of the bare carbon. When a catalyst is introduced, such as a runway fluid (e.g., a deicer), the parabola further narrows, leading to earlier onset of high oxidation rates.

The catalytic oxidation model 308 utilizes a generally well-known methodology for characterizing the time and temperature effect on a reaction rate. Specifically, a TGA is used to determine the weight loss of carbon materials in the catalyzed and non-catalyzed conditions as functions of time and temperature. Three or more temperatures are investigated, and a rate constant is then calculated for the oxidation reactions at each temperature. Finally, these rate constants are curve fit vs. temperature using the Arrhenius equation. The resulting models then describe the time and temperature behavior of the oxidizing carbon, and thus the weight loss thereof.

Referring once again to FIG. 1, the processor 110, implementing each of the above-described models 302-308, calculates a set of four condition indicators, CI(n), for each brake assembly 100 installed on the aircraft based on the data available after the $n_{th}$ landing. These condition indicators are: (1) the landing energy (in MJ) absorbed by the brake assembly 100 (E(n)); (2) friction material weight loss (in pounds) due to normal usage of the brakes ($\Delta W_{wr}(n)$); (3) friction material weight loss (in pounds) due to thermal oxidation ($\Delta W_{to}(n)$); and (4) friction material weight loss in pounds due to catalytic oxidation ($\Delta W_{co}(n)$).

Mathematically the condition indicator, CI(n), is a 4-dimension state variable that may be expressed in vector notation as:

$$CI(n) = \begin{bmatrix} E(n) \\ \Delta W_{wr}(n) \\ \Delta W_{to}(n) \\ \Delta W_{co}(n) \end{bmatrix}$$

$$= \begin{bmatrix} \text{Landing energy } (MJ) \\ \text{Weight loss due to normal wear (lb)} \\ \text{Weight loss due to thermal oxidation (lb)} \\ \text{Weight loss due to cataylite oxidation (lb)} \end{bmatrix}$$

It should be noted that for an aircraft that has N-number of brake assemblies 100, the processor 110 will generate 4×N values using the data available after every landing. The 4-dimensional state variable is updated periodically whenever a new temperature is available from the sensor 104 and a landing report is available from the landing conditions data source 108. In addition, if a user manually enters wear-pin length or indicates that a maintenance action has been performed, the CI(n) values will be updated (or reset to initial values).

A condition indicator can be trended and used as a visual indicator for subject matter expert-in-the loop decision making. To automate some of this decision making, appropriate threshold values are supplied, and corresponding health indicators (HI(n)) are generated and displayed based on these condition indicators (CI(n)). In one exemplary embodiment, color-coded (e.g., red/yellow/green) health indicators are generated such that:

$$HI(n) = \begin{cases} GREEN, & CI(n) < \theta_Y & \text{action: do nothing} \\ YELLOW, & \theta_Y \leq CI(n) < \theta_R & \text{action: visual inspection} \\ RED, & CI(n) \geq \theta_R & \text{action: remove and replace} \end{cases}$$

The processor 110 may be additionally configured to command a display device 150 to display the condition and health indicators. The manner in which the condition and health indicators are display may vary. For example, the condition and health indicators may be displayed as depicted in FIG. 1. Alternatively, the condition indicators may be displayed as data points plotted over time along with trend-line plot (e.g. running average). The trend-line plot may include graphics illustrating transitions between red-yellow-green health indicators for that condition indicator. In yet another alternative, the condition indicators may be displayed numerically with the latest value displayed along with an indication of its corresponding health indicator (e.g. the number is displayed green-yellow-red as appropriate).

It will be appreciated that the computation of the condition and health indicators may be performed by the processor 110, in real-time, on board the aircraft, and then downloaded from the aircraft. Alternatively, the raw data may be downloaded (via either a wired or wireless connection) from the aircraft and to a ground system 160 (see FIG. 1), which is configured to compute the condition and health indicators. In either case, the condition and health indicators are preferably stored, for example, on a central server.

In some embodiments, end-users (e.g., operators, maintainers, etc.) may access condition and health indicator information via, for example, a suitable web interface. The web interface is preferably configured to provide brake condition information for all assets for which that end-user has been granted access. As an example, the end-user may navigate to a particular asset through a folder-tree or using a search box. In addition, the user may have access to a high-level summary view of all assets simultaneously. For example, a page may display the individual health indicators as colors for each asset, providing a quick visual inspection to single out potential problems. The high-level view may include filters to focus on, for example, a single aircraft type, brake location, flight region, red health indicators, etc.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of estimating health of aircraft brake system friction material, comprising the steps of:
   sensing a temperature of the friction material;
   supplying the sensed temperature to a processor-implemented thermal model, the processor-implemented thermal model configured to estimate friction material temperatures at one or more locations on the friction material;
   supplying the estimates of friction material temperatures to a processor-implemented thermal oxidation model, the processor-implemented thermal oxidation model configured, based on the estimates of friction material temperatures, to estimate friction material loss due to thermal oxidation;
   supplying data representative of runway fluid exposure to a processor-implemented catalytic oxidation model, the processor-implemented catalytic oxidation model configured, based on the runway fluid exposure, to estimate friction material loss due to catalytic oxidation; and
   estimating the health of the friction material based on the estimates of friction material loss from the processor-implemented thermal oxidation model and the processor-implemented catalytic oxidation model.

2. The method of claim 1, wherein the data representative of runway fluid exposure comprise:
   data representative of chemical composition of the runway fluid; and
   data representative of exposure time to the runway fluid.

3. The method of claim 1, further comprising:
   supplying data representative of aircraft landing conditions to a processor-implemented wear model, the processor-implemented wear model configured, based on the aircraft landing conditions, to estimate friction material loss due to wear.

4. The method of claim 3, wherein the step of estimating the remaining useful life is additionally based on friction material loss from the processor-implemented wear model.

5. The method of claim 3, wherein the data representative of aircraft landing conditions comprise:
   aircraft landing energy;
   number of taxi stops; and
   ambient temperature while landing.

6. The method of claim 3, further comprising:
   supplying the data representative of aircraft landing conditions from an aircraft condition monitoring system (ACMS).

7. The method of claim 1, further comprising:
   generating a condition indicator representative of friction material loss.

8. The method of claim 7, wherein the condition indicator is a multi-dimensional state variable comprising at least a condition indicator representative of friction material loss due to thermal oxidation and a condition indicator representative of catalytic oxidation.

9. The method of claim 8, further comprising:
   comparing trends of each condition indicator to a predetermined threshold value; and
   generating a health indicator for each condition indicator based on the trend comparisons.

10. A system for estimating remaining useful life of brake system friction material, comprising:
    a temperature sensor configured to sense a temperature that is at least representative of the friction material and supply a friction material temperature signal;
    a runway fluid data source configured to at least selectively supply data representative of runway fluid exposure; and
    a processor coupled to receive the friction material temperature signal and the data representative of runway fluid exposure and configured, upon receipt thereof, to:
       estimate friction material temperatures at one or more locations on the friction material,
       estimate friction material loss due to thermal oxidation based on the estimates of friction material temperatures,
       estimate friction material loss due to catalytic oxidation based on the runway fluid exposure, and
       estimate the remaining useful life of the friction material based on the estimates of friction material loss.

11. The system of claim 10, wherein the processor is further configured to implement a thermal model to estimate the friction material temperatures at one or more locations on the friction material brake.

12. The system of claim 10, wherein the processor is further configured to implement a thermal oxidation model to estimate the friction material loss due to thermal oxidation.

13. The system of claim 10, wherein the processor is further configured to implement a catalytic oxidation model to estimate friction material loss due to catalytic oxidation.

14. The system of claim 10, wherein the data representative of runway fluid comprises:
    data representative of chemical composition of the runway fluid; and
    data representative of exposure time to the runway fluid.

15. The system of claim 10, further comprising:
    a landing conditions data source configured to supply data representative of aircraft landing conditions,
    wherein the processor is further configured to (i) implement a wear model and (ii) estimate friction material loss due to wear based on the aircraft landing conditions.

16. The system of claim 15, wherein the data representative of aircraft landing conditions comprise:
    aircraft landing energy;
    number of taxi stops; and
    ambient temperature while landing.

17. The system of claim 15, wherein the landing conditions data source comprises an aircraft condition monitoring system (ACMS).

18. The system of claim 10, further comprising:
    a display device in communication with the processor and configured to render images,
    wherein the processor is further configured to:
       generating condition indicators representative of friction material loss, and
       supply image rendering display commands to the display device that cause the display device to render images representative of the condition indicators.

19. The system of claim 18, wherein the processor is further configured to:
    compare trends of each condition indicator to a predetermined threshold value;
    generate a health indicator for each condition indicator based on the trend comparisons; and
    supply image rendering display commands to the display device that cause the display device to render images representative of the health indicators.

20. The system of claim 19, wherein the processor is further configured to selectively download the condition and health indicators to a remote server.

\* \* \* \* \*